United States Patent [19]
Cox

[11] Patent Number: 6,116,569
[45] Date of Patent: Sep. 12, 2000

[54] VALVE CONSTRUCTION

[75] Inventor: Donald W. Cox, Milford, Mich.

[73] Assignee: Maxitrol Company, Southfield, Mich.

[21] Appl. No.: 09/034,742

[22] Filed: Mar. 4, 1998

[51] Int. Cl.⁷ .................................................. F16K 31/02
[52] U.S. Cl. ............................................. 251/11; 251/75
[58] Field of Search .............................. 251/11, 75, 303, 251/298

[56] References Cited

U.S. PATENT DOCUMENTS

| | | |
|---|---|---|
| 3,327,946 | 6/1967 | Benson ................................. 251/75 X |
| 4,067,539 | 1/1978 | Perl . |
| 4,102,496 | 7/1978 | Perl . |
| 4,142,553 | 3/1979 | Sakakibara et al. ................... 251/75 X |
| 4,651,968 | 3/1987 | Shopsky . |
| 4,681,296 | 7/1987 | Shopsky . |
| 4,685,652 | 8/1987 | Shopsky . |
| 4,769,887 | 9/1988 | Shopsky . |
| 4,856,164 | 8/1989 | Shopsky . |
| 4,955,583 | 9/1990 | Shopsky . |
| 4,958,801 | 9/1990 | Shopsky . |
| 5,037,061 | 8/1991 | Shopsky . |
| 5,318,268 | 6/1994 | Cox et al. . |
| 5,353,828 | 10/1994 | Troscinski ............................. 251/75 X |

FOREIGN PATENT DOCUMENTS 2445920  1/1979  France ..................................... 251/11

*Primary Examiner*—John Rivell
*Assistant Examiner*—Meredith H Schoenfeld
*Attorney, Agent, or Firm*—Harness, Dickey & Pierce, P.L.C.

[57] ABSTRACT

An improved snap action valve construction is disclosed in which stiffening ribs are provided on the snap blade in an area adjacent the valve member carried thereby to aid in resisting flexing of the blade in this area. Additionally, a rib may be provided on the snap blade to provide a pivotable line contact between the snap blade and associated valve member to ensure better sealing engagement with the valve seat. In one embodiment stiffening ribs are also provided on a compensator blade in the area of attachment to the active blade to provide increased resistance to flexing in this area due to heat transfer from the active blade. In another embodiment, the compensator blade is secured to the snap blade in spaced relationship to the active blade so as to limit heat transfer therebetween.

37 Claims, 4 Drawing Sheets

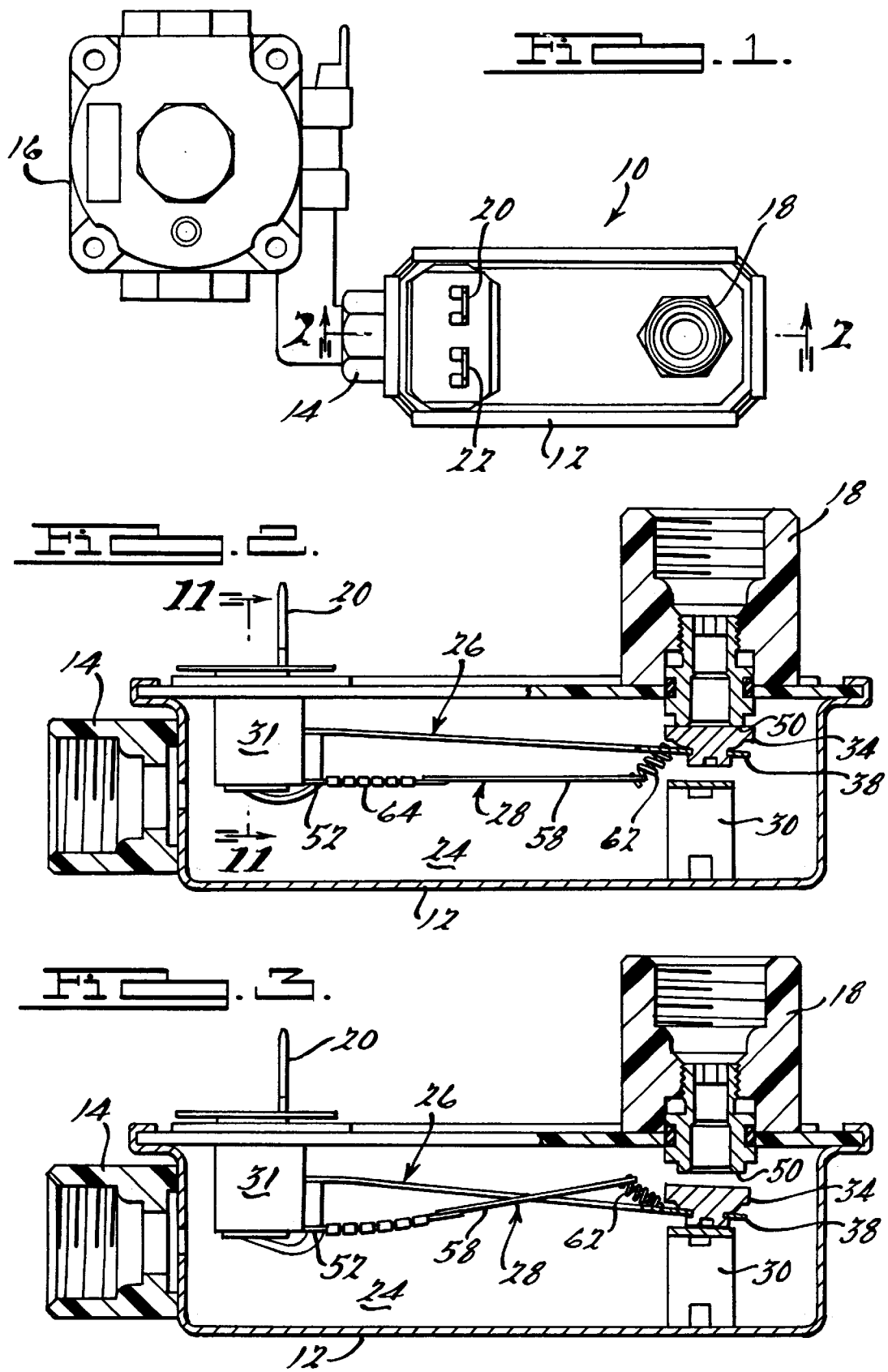

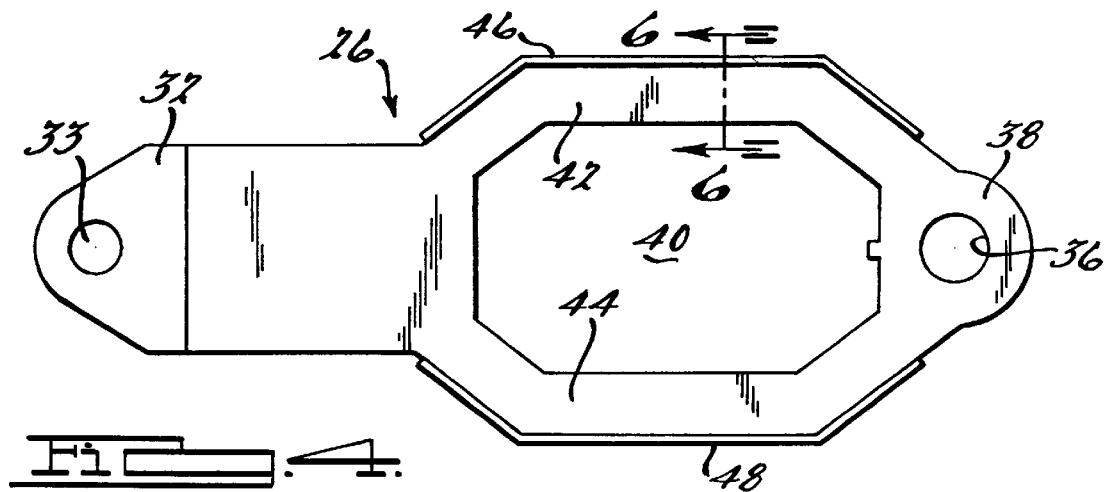
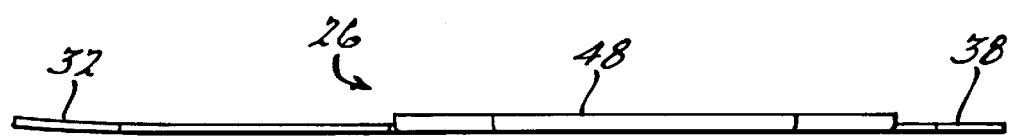
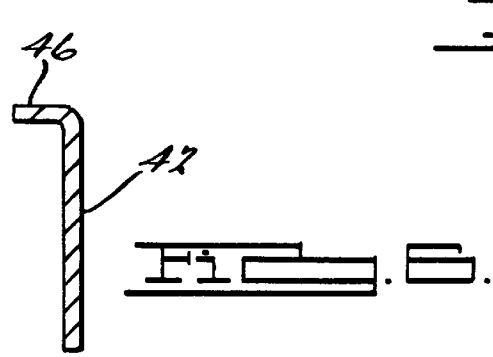
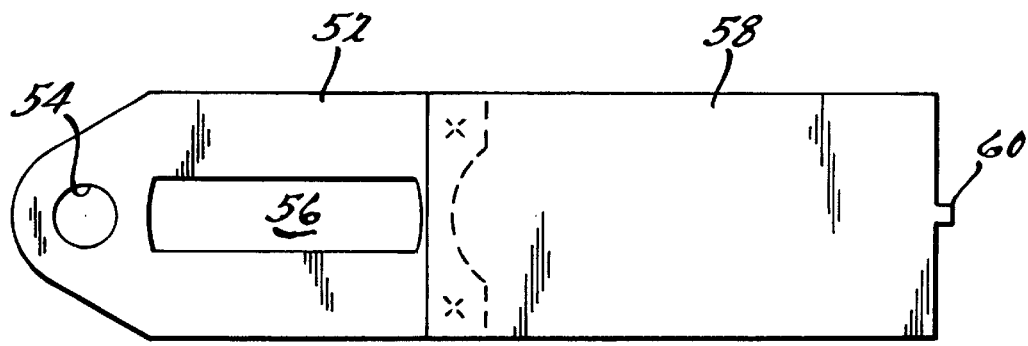
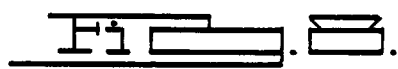

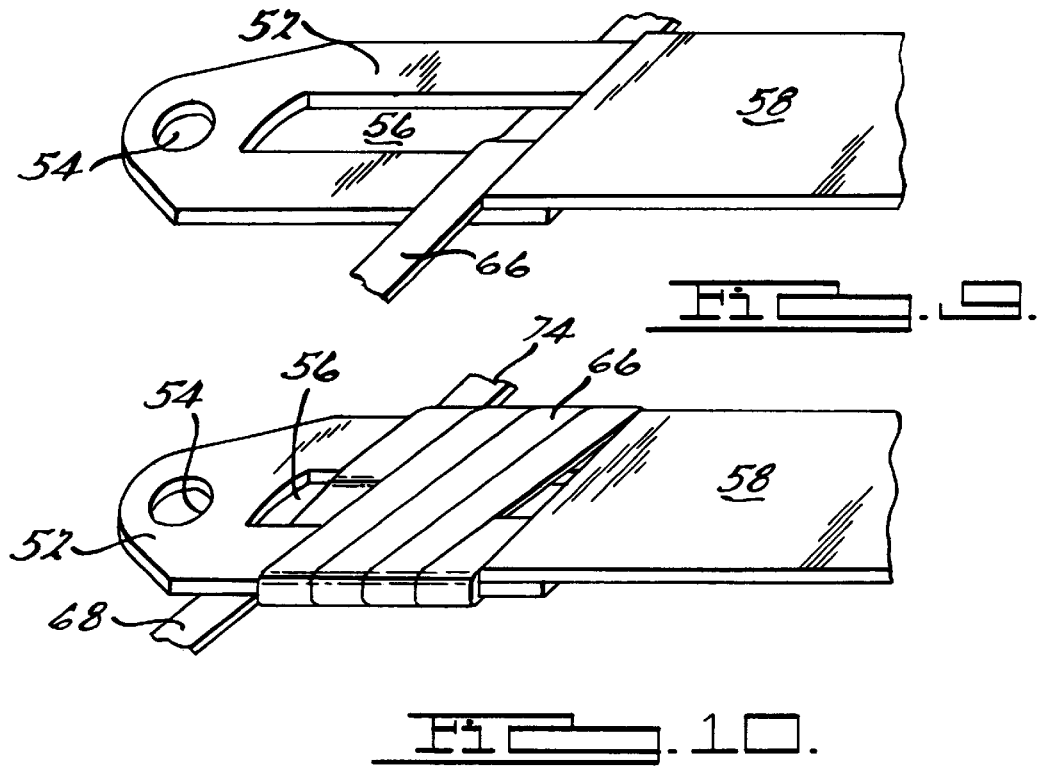
FIG. 9.
FIG. 10.
FIG. 11.
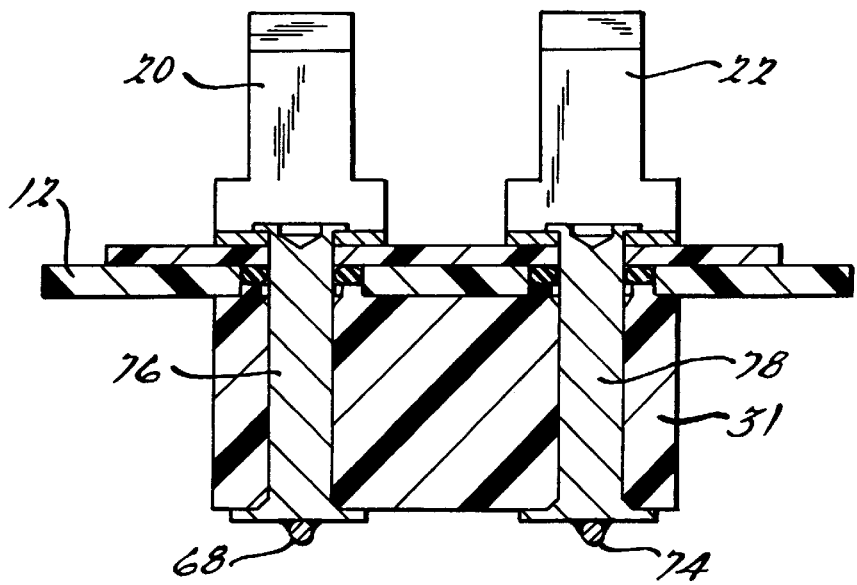

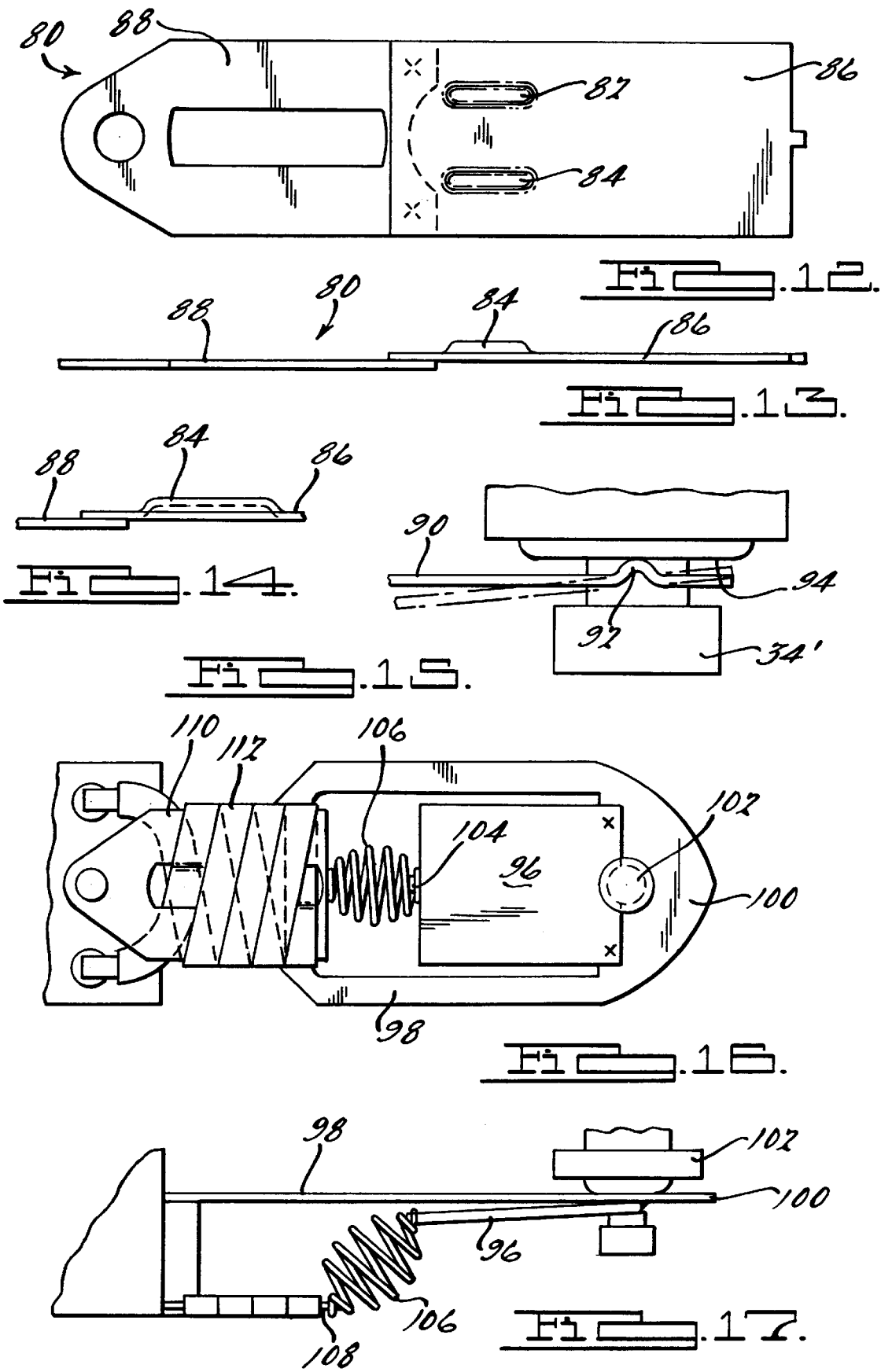

VALVE CONSTRUCTION

BACKGROUND AND SUMMARY OF THE INVENTION

The present invention is directed generally to snap action valves and more specifically to such valves which are specifically adapted for use to control flow of fluids in response to a control signal such as may be used in gas fired appliances or the like.

Snap action valves of the type with which the present invention is concerned typically employ a valve member supported on one end of a snap blade, the other end of which is fixedly supported on the housing. A bimetallic actuator is utilized to effect movement of the free end of the snap blade so as to move the valve member into and out of sealing engagement with a valve seat surrounding a discharge passage.

The bimetallic actuator may include a first bimetallic active blade, one end of which is fixedly supported on the housing and having an electrical actuated heating coil provided thereon. A bimetallic compensator blade may be secured to the free end of the active blade and is operatively interconnected to the snap blade adjacent the valve carrying end by an over-center spring. When in a closed position, the spring acts between the compensator blade and the snap blade to augment the closing force exerted on the valve member by the snap blade. When the valve is actuated to an open position, the compensator blade is moved through an opening in the snap blade as a result of heating of the active blade by the heating coil thereby initially compressing the spring and causing its line of action to pivot about the snap blade until its line of action causes the snap blade to move the valve member out of engagement with the valve seat in a "snap" like movement.

The use of snap action type valve opening arrangement ensures that the valve is opened fully as quickly as possible and in order to assist in this rapid opening, it is desirable that the "hinge point" or area of flexing of the snap blade be located away from the end on which the valve is mounted. However, the opening in the snap blade provided to accommodate movement of the bimetallic actuator results in an area of reduced stiffness thus shifting the "hinge point" into relatively close proximity to the valve member.

The present invention overcomes this problem by incorporating stiffening ribs on the snap blade extending from a location adjacent the valve member along the area in which the opening is located. These stiffening ribs serve to increase the rigidity of the snap blade in the area of the opening and thus shift the hinge point away from the spring connection and valve member. In addition the present invention may incorporate a rib extending substantially diametrically with respect to the opening in the snap blade within which the valve member is supported and also extending substantially perpendicular to the longitudinal axis of the snap blade. This rib serves to provide a generally line contact with the valve member so as to enable it to pivot thereabout as the valve member moves into engagement with the valve seat. This pivoting movement enables the valve member to accommodate relative angulation between the plane of the valve carrying end of the snap blade and the valve seat as the member moves into engagement therewith.

As previously mentioned, the bimetallic actuator incorporates an active bimetallic blade and a compensator bimetallic blade connected to the free end of the active blade. While the active blade (containing the heating coil) deflects in response to heating thereof to open the valve, the compensator blade is provided in order to compensate for deflection of the active blade as a result of changes in the ambient temperature. However, because of the interconnection between the compensator blade and active blade, some of the heat being applied to the active blade by the heating coil will be conducted to the compensator blade resulting in undesirable offsetting deflection thereof.

In one embodiment, the present invention provides one or more longitudinally extending reinforcing ribs on the compensator blade extending from its point of attachment to the active blade toward the free end thereof. These stiffening ribs will serve to resist deflection of the compensator blade in the area adjacent its connection with the active blade which will be the area experiencing the greatest heating from the active blade. Thus in this manner the effect of heat conduction from the active blade to the compensator blade will be reduced or minimized.

In another embodiment, the compensator blade is secured to the snap blade and the only interconnection with the active blade is via the spring. This arrangement effectively eliminates the conductive heat transfer from the active blade to the snap blade.

It is desirable to insulate the active blade from the current flowing through the heater coil and to minimize the time and effort required to assemble the heater wire to the active blade.

In the present invention, the active blade is provided with an opening through which the heater strip is passed. Thereafter, two ends of the heater strip or tape are wrapped about the active blade together along the length of the active blade. The free ends of the heater tape may than be suitably secured to electrical contacts provided on the housing.

Additional advantages and features of the present invention will become apparent from the subsequent description and the appended claims taken in conjunction with the accompanying drawings.

BRIEF DESCRIPTION OF THE DRAWINGS

FIG. 1 is a plan view of a valve assembly in accordance with the present invention shown connected to a pressure regulator.

FIG. 2 is a section view of the valve assembly of FIG. 1, the section being taken along line 2—2 thereof;

FIG. 3 is a view similar to that of FIG. 2 but showing the valve assembly in an open position;

FIG. 4 is a plan view of the snap blade incorporated in the valve assembly of FIGS. 1–3;

FIG. 5 is an elevational view of the snap blade shown in FIG. 4;

FIG. 6 is an enlarged fragmentary section view of the snap blade shown in FIG. 4, the section being taken along line 6—6 thereof;

FIG. 7 is a plan view of the active blade and compensator blades forming a part of the valve assembly of FIGS. 1–3 and shown in assembled relationship;

FIG. 8 is an elevational view of the assembly shown in FIG. 7;

FIG. 9 is an enlarged fragmentary perspective view of the assembly of FIG. 7 showing the heater tape installed through an opening in the active blade in preparation for winding;

FIG. 10 is a view similar to that of FIG. 9 but showing the heater tape fully wrapped about the active blade;

FIG. 11 is a section view of the mounting arrangement for the blades, the section being taken along lines 11—11 of FIG. 2;

FIGS. 12 and 13 are views similar to those of FIGS. 7 and 8 but showing a modified assembly all in accordance with the present invention;

FIG. 14 is a fragmentary view of a compensator blade similar to that shown in FIGS. 12 and 13 but having an elongated temperature compensating rib all in accordance with the present invention;

FIG. 15 is a fragmentary view showing an end portion of a modified snap blade having a valve member assembled thereto all in accordance with the present invention;

FIG. 16 is a partial plan view of another embodiment of the valve assembly showing a compensator blade secured to the snap blade all in accordance with the present invention; and FIG. 17 is an elevational view of the embodiment shown in FIG. 16.

DESCRIPTION OF THE PREFERRED EMBODIMENT

Referring now to the drawings and more specifically to FIGS. 1–3, there is shown a valve assembly 10 in accordance with the present invention. Valve assembly 10 is shown as including a housing 12 having an inlet 14 to which is connected a pressure regulator 16, an outlet 18 and a pair of electrical terminals 20 and 22 insulated from and upstanding from housing 12. As best seen with reference to FIGS. 2 and 3, housing 12 defines a substantially closed chamber 24 within which is disposed a snap blade 26, a bimetallic actuating mechanism 28 and a stop member 30.

Snap blade 26 comprises an elongated relatively thin blade preferably fabricated from a suitable resilient metal material such as spring steel. One end 32 of snap blade 26 is fixedly secured to a mounting post 31 disposed within chamber 24 by means of opening 33 provided therein and a valve member 34 is fitted within an opening 36 provided adjacent the opposite free end 38 thereof. An elongated generally rectangular shaped opening 40 is provided in snap blade 26 intermediate the ends thereof being defined by laterally spaced leg portions 42 and 44. A relatively small tab member 46 is provided adjacent end 38 and projects inwardly into opening 40 being generally centered between respective leg portions 42 and 44. Each leg portion 42 and 44 includes an upwardly projecting stiffening rib 46 and 48 formed therein which extends longitudinally preferably along the laterally opposite edges thereof slightly beyond than the opposite longitudinal ends of opening 40. It should be noted that ribs 46 and 48 may alternatively be formed along the center of each leg portion if desired.

Snap blade 26 is mounted on post 31 in such a manner as to normally bias valve member 34 into sealing engagement with valve seat 50 so as to prevent flow of fluid from chamber 24 through discharge 18.

In order to move snap blade 26 to a position as shown in FIG. 3 wherein valve member 34 is spaced from valve seat 50 a bimetallic actuator assembly 28 is provided. As best seen with reference to FIGS. 7–10, bimetallic actuator assembly 28 includes an elongated relatively thin bimetallic active blade 52 having an opening 54 at one end thereof by which it is fixedly secured to mounting post 31 in spaced relationship to snap blade 26. A centrally disposed elongated generally rectangularly shaped opening 56 is also provided in active blade 52 intermediate the ends thereof. An elongated relatively thin bimetallic compensator blade 58 is secured to the opposite end of active blade 52 in a suitable manner such as by spot welding and extends outwardly therefrom. A relatively small tab 60 projects longitudinally outwardly from the free end of compensator blade 58 and provides a retaining seat for one end of spring 62. The other end of spring 62 is seated on and retained by tab 46 provided on snap blade 26.

As shown in FIG. 2, active blade 52 and compensator blade 58 are mounted on post 31 in such a position that they extend below snap blade 26 and are biased such that they act through and in conjunction with spring 62 to augment the biasing force of snap blade 26 urging valve member 34 into sealing engagement with valve seat 50. The orientation of compensator blade 58 is such that upon an increase in temperature the free end thereof to which spring 62 is connected will deflect downwardly as shown in FIG. 2 away from valve seat 50. In opposition thereof, active blade 52 is oriented such that upon an increase in temperature, the end thereof remote from post 31 will deflect upwardly as shown in FIG. 2.

In order to effect controlled actuation of bimetallic actuator assembly 28, a heating coil 64 is wound on active blade 52. Preferably heating coil will comprise a length of relatively flat ribbon-like resistance heating wire 66 having a suitable outer insulating sleeve provided thereon. In order to wind heating wire 66 on active blade 52, one end thereof is first passed through opening 56 and positioned at the end adjacent compensator blade 58 as shown in FIG. 9. The two ends of heating wire 66 are then brought together such that a center portion is wrapped around one of the two legs of active blade 52 which define opening 56 and thereafter heating wire 66 is wrapped about the outer periphery of active blade 52 extending along the length thereof toward the end at which opening 54 is disposed. It is important that the respective wraps be placed directly against the surface of active blade 52 and not be allowed to overlap each other. Upon completion of the wrapping process, one of the free ends 68 will again be passed through opening 56 and the two free ends then brought upon on the opposite lateral edges of active blade 52. Thereafter, the two uninsulated ends 68 and 74 thereof are suitably secured to a pair of electrical terminals 76 and 78 which extending upwardly through mounting post 31 and are electrically connected to terminals 20 and 22.

In use, when valve assembly is not energized, valve member 34 will be held in a closed position as shown in FIG. 2 with snap blade 26 and bimetallic actuator assembly 28 acting together to exert a biasing force thereon. If the ambient air or gas temperature within chamber 24 increases, active blade 52 will deflect somewhat upwardly as shown toward snap blade 26. However, compensator blade will deflect in the opposite direction to thereby substantially offset any increase in the biasing force exerted on valve member 34.

When it is desired to open discharge passage 18, control means will operate to provide an electrical current to heating coil 64 via terminals 20 and 22. As current flows through heating coil 64, active blade 52 will deflect upwardly as shown in FIG. 3 carrying compensator blade along with it. Because compensator blade 58 is not being heated by heating coil, it will remain in substantially the same configuration it was in before heating coil 64 was energized. Thus, as active blade 52 is heated and deflects upwardly, compensator blade will move upwardly with the free end thereof moving through opening 40 provided in snap blade 26. During this movement spring 62 will be compressed until such time as tab 60 is in a position such that it substantially lies in the plane defined by snap blade 26 at which point it will reach a maximum state of compression and its line of action will be directed generally perpendicular to the axis of discharge passage 18. Continued heating of active blade 52 will result in further upward movement of tab 60 upward beyond the plane defined by snap blade 62 with the result that spring 62 will now be acting along a line in opposition to the biasing force exerted by snap blade 26 and will thus cause snap blade 26 and valve member 34 to move rapidly downwardly into an open position as shown in FIG. 3. Stop member 30 will operate to limit the opening movement of valve member 34 and support same against the biasing force of spring 62 while heating coil continues to supply heat to active blade 52. When fluid flow through discharge passage 18 is no longer desired, the control means will interrupt the flow of electrical current to heating coil 64 thereby allowing active blade to cool and return to its prior shape. As active blade cools, compensator blade will move downwardly as shown in FIG. 3 again compressing spring 62 until such time as tab moves through the plane defined by snap blade 26 whereupon the time that spring 62 and the biasing force of snap blade 26 will work together to rapidly move valve member 34 into the closed position shown in FIG. 2.

It should be noted that it is desirable to maintain the plane defined by the end portion 38 of snap blade 26 as close to perpendicular to the axis of discharge passage 18 as possible so as to ensure full substantially simultaneous seating of valve member 34 with valve seat 50 around its active surface. In order to accomplish this objective, it is desirable to position the hinge point or area at which snap blade 26 flexes as far away from valve 34 as possible. However, opening 40 in snap blade 26 which is located nearer end 38 at which valve member 34 is disposed serves to increase the flexibility of snap blade 26 in this area. Thus, in order to offset this increase flexibility and to shift the hinge point further away from valve member 34, stiffening ribs 46 and 48 are provided along respective legs 42 and 44. The degree of stiffening and hence resistance to flexing can be easily controlled by proper selection of the contour, size, and length of the stiffening ribs provides.

Because the compensator blade is fixed to the active blade, heating of the active blade by the heating coil will result in some conductive heating of the compensator blade. This conductive heating will create a temperature gradient along the length of the compensator blade with the highest temperatures being at the point of attachment to the active blade. This conductive heating of the compensator blade will result in some deflection thereof which deflection will be in the opposite direction of the desired deflection of the active blade. Further, because the greatest conductive heating will occur immediately adjacent the active blade, the greatest deflection will occur in this area.

In order to offset this conductive heating deflection, the active compensator blade assembly 80 shown in FIGS. 12–13 incorporates a pair of stiffening ribs 82 and 84 extending longitudinally from a location immediately adjacent the juncture between compensator 86 and active blade 88. These stiffening ribs will operate to increase the temperature required for a given deflection of the compensator blade in this area thereby resisting the deflection resulting from the conductive heating thereof in the area of greatest temperature rise. The degree of deflection resistance desired may be easily controlled by proper selection of the size and shape of the stiffening ribs. Further, the area over which the increased resistance to deflection is desired may be increased by lengthening the stiffening ribs as shown in FIG. 14. In all other respects, active/compensator blade assembly 80 is substantially identical to the assembly of active blade 52 and compensator blade 58 described above and active blade 88 will incorporate a heating coil substantially identical to heating coil 64 described above. It should be noted that while compensator blade 80 is shown as incorporating a pair of ribs 82 and 84 positioned between the laterally opposite edges thereof, it may be possible to utilize any number of such ribs as well as position them inboard from or even along the lateral edges thereof.

Occasionally there may be some slight variation from the ideal in which the plane defined by the end portion 38 of snap blade 26 is perpendicular to the axis of the discharge passage as the valve member 34 contacts the valve seat 50. When this occurs, the valve 34 may not seat fully as rapidly as desired. In order to offset this potential problem, snap blade 90 shown in FIG. 15 is provided with a diametrically extending rib 92 positioned so as to extend through the center of the opening 36 within which valve member 34' is fitted and extending substantially perpendicular to the longitudinal axis of snap blade 90. The apex of rib 92 will provide a line contact with shoulder 94 provided on valve 34' thereby enabling valve 34' to rock or pivot thereabout slightly thus offsetting any variance in the angulation of the plane defined by end portion 38' of snap blade 90 and the plane of the valve seat. Of course, opening 36 will provide a relatively loose fit with valve 34' in order to accommodate this movement. Thus rapid full seating of the valve member 34' will be assured.

Another embodiment of the snap blade and bimetallic actuating assembly is illustrated and will be described with reference to FIGS. 16 and 17. In this embodiment, compensator blade 96 has one end secured to snap blade 98 at end 100 thereof on which valve member 102 is supported. A relative small tab 104 is provided on the opposite end of compensator blade 96 which is similar to tab 60 described above and serves to provide a mounting point for one end of spring 106. The opposite end of spring 106 is in turn supported on a small centrally located tab 108 provided on the free end of active blade 110. As described with reference to active blade 52, a heating coil 112 is provided thereon which may be wound thereon in the same manner as described above.

As may now be appreciated, because the compensator blade 96 and active blade 110 are only interconnected by spring 106, the conductive heating of compensator blade 96 when heating coil 112 is heating active blade 110 will be substantially eliminated thus increasing the ability of compensator blade 96 to compensate only for variations in ambient temperatures.

It should be noted that snap blade 98 may incorporate the stiffening ribs 46 and 48 described above if desired as well as rib 92 described with reference to FIG. 15. The snap blade 98 and bimetallic actuator assembly of FIGS. 16 and 17 may be easily substituted for the snap blade 26 and bimetallic actuator assembly 28 described above and the assembly and operation thereof will be substantially identical to that described above with the exception that compensator blade 96 will be mounted so that the free end thereof deflects toward snap blade 98 upon an increase in the ambient temperature.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. A valve assembly comprising:
   a housing having an inlet passage and an outlet passage;
   a valve seat within said housing and surrounding said outlet passage;
   an elongated snap blade disposed within said housing and having one end fixedly supported therein;
   a valve member carried on the other end of said snap blade and movable into and out of engagement with said valve seat to control fluid flow through said outlet passage;
   an actuating assembly for effecting movement of said snap blade about said one end whereby said valve member is moved into and out of engagement with said valve seat;
   said snap blade including an opening therein defined in part by a longitudinally extending leg portion; and
   a stiffening member formed along at least a portion of said leg, said stiffening member being operative to resist flexing of said snap blade in the area of said opening.

2. A valve assembly as set forth in claim 1 wherein said stiffening member extends longitudinally along at least a portion of said leg portion.

3. A valve assembly as set forth in claim 2 wherein said stiffening member is at least coextensive with said leg portion.

4. A valve assembly as set forth in claim 1 wherein said opening is positioned adjacent said other end of said snap blade.

5. A valve assembly as set forth in claim 1 wherein said snap blade flexes in response to movement of said valve member, said stiffening member being operative to shift the area of flexing of said snap blade toward said one end.

6. A valve assembly as set forth in claim 1 wherein said actuating assembly includes a bimetallic active blade operative to exert a biasing action on said snap blade in a first direction when in a first position and in a second direction when in a second position.

7. A valve assembly as set forth in claim 6 further comprising a heating coil supported on said bimetallic active blade, said heating coil being operative to effect movement of said bimetallic active blade between said first and second positions in response to flow of electrical current therethrough.

8. A valve assembly as set forth in claim 6 wherein said opening in said snap blade is sized to allow movement of a portion of said bimetallic active blade from one side of said snap blade to the opposite side of said snap blade.

9. A valve assembly as set forth in claim 1 wherein said valve member is supported within a second opening in said snap blade.

10. A valve assembly as set forth in claim 9 further comprising a support member formed on said snap blade, said support member forming a line contact engagement with said valve member.

11. A valve assembly as set forth in claim 10 wherein said line contact extends substantially perpendicular to the longitudinal axis of said snap blade.

12. A valve assembly as set forth in claim 1 wherein said actuating assembly includes a bimetallic compensator blade secured to said snap blade adjacent said other end.

13. A valve assembly as set forth in claim 12 wherein said actuator assembly includes a bimetallic active blade having one end fixedly supported in said housing and a heating coil on said active blade, said active blade cooperating with said compensator blade to effect movement of said snap blade in response to heating of said active blade by said heating coil.

14. A valve assembly as set forth in claim 13 wherein said actuating means further comprises a spring extending between said active blade and said compensator blade.

15. A valve assembly as set forth in claim 1 wherein said actuating assembly includes a bimetallic active blade having one end fixedly supported within said housing, a bimetallic compensator blade secured to the other end of said active blade and a heating coil supported on said active blade to selectively heat said active blade to thereby deflect said active blade and effect said movement of said snap blade.

16. A valve assembly as set forth in claim 15 wherein said bimetallic compensator blade includes stiffening portions formed thereon, said stiffening portions being operative to resist deflection of said compensator blade in response to heat transferred thereto from said active blade.

17. A valve assembly as set forth in claim 16 wherein said stiffening portions are formed adjacent the juncture with said active blade.

18. A valve assembly as set forth in claim 17 wherein said stiffening portions comprise ribs extending longitudinally of said compensator blade intermediate the opposite lateral edges.

19. A valve assembly as set forth in claim 1 wherein said opening in said snap blade is sized to allow movement of a portion of said bimetallic active blade from one side of said snap blade to the opposite side of said snap blade.

20. A valve assembly comprising:
    a housing having an inlet passage and an outlet passage;
    a valve seat within said housing and surrounding said outlet passage;
    a valve member movably supported within said housing and selectively movable into and out of engagement with said valve seat to selectively control fluid flow through said outlet passage; and
    an actuating assembly for effecting movement of said valve member, said actuating assembly including
      a bimetallic active blade having one end fixedly supported within said housing;
      a bimetallic compensator blade having one end secured to the other end of said active blade; and
      a heating coil supported on said active blade, said heating coil being operative to heat said active blade to thereby cause said active blade to deflect, deflection of said active blade causing movement of said compensator blade whereby said valve member is moved out of engagement with said valve seat,
    said compensator blade including a deflection resisting portion formed thereon, said deflection resisting portion being positioned closer to said one end of said compensator blade than the other end and operative to resist deflection of said compensator blade in response to heat transferred from said active blade.

21. A valve assembly as set forth in claim 20 wherein said deflecting resisting portion is located immediately adjacent said one end of said compensator blade.

22. A valve assembly as set forth in claim 21 wherein said deflecting resisting portion comprises a rib formed on said compensator blade.

23. A valve assembly as set forth in claim 21 wherein said deflection resisting portion comprises a pair of ribs formed on said compensator blade.

24. A valve assembly as set forth in claim 20 further comprising a snap blade having one end fixedly secured within said housing, said valve member being supported on and movable with said snap blade.

25. A valve assembly as set forth in claim 24 further comprising a spring extending between the other end of said compensator blade and said snap blade.

26. A valve assembly as set forth in claim 25 wherein said active blade and said compensator blade cooperate to exert a biasing force on said snap blade in a direction to urge said valve member into engagement with said valve seat when in a first position relative to said snap blade and to exert a biasing force on said snap blade in a direction to move said valve member away from said valve seat when in a second position.

27. A valve assembly as set forth in claim 20 wherein said snap blade has an opening therein intermediate the ends thereof, at least a portion of said compensator blade moving through said opening as said active blade and said compensator blade move from said first position to said second position.

28. A valve assembly as set forth in claim 27 wherein said opening is defined in part by a pair of spaced leg portions, each of said leg portions having deflecting resisting portions formed thereon.

29. A valve assembly as set forth in claim 28 wherein said deflecting resisting portions extend along the length of each of said leg portions.

30. A valve assembly as set forth in claim 20 wherein said heater coil is electrically insulated from said active blade.

31. A valve assembly as set forth in claim 30 wherein said active blade includes an opening therein, said heater coil comprises a length of heating wire having a portion intermediate the ends thereof extending through said opening.

32. A valve assembly as set forth in claim 30 wherein said opening in said active blade is positioned adjacent the other end of said active blade.

33. A valve assembly comprising:

a housing having an inlet passage and an outlet passage;

a valve seat within said housing surrounding said outlet passage;

a snap blade provided within said housing, said snap blade having a first end fixedly supported on said housing and a second free end;

a valve member supported on and movable with said free end;

a compensator blade secured to said snap blade adjacent said free end;

an active blade having a heating coil supported thereon, said active blade having one end fixedly supported on said housing; and spring means interconnecting said active blade and said compensator blade, said active blade being operative to bias said valve member into engagement with said valve seat via said spring and said compensator blade when in an unheated condition and to bias said valve member away from said valve seat when in a heated condition.

34. A valve assembly as set forth in claim 33 wherein said snap blade has an opening therein intermediate the ends thereof, said opening being defined in part by a pair of spaced leg portions each of said leg portions having deflection resisting portions formed thereon, said deflection resisting portions being operative to resist flexing of said snap blade in the area of said opening.

35. A valve assembly as set forth in claim 33 wherein heating of said active blade causes a portion thereof to move through said opening in said snap blade.

36. A valve assembly as set forth in claim 33 wherein said valve member is loosely disposed within a valve opening in said snap blade and said snap blade includes a raised portion engageable with a shoulder provided on said valve member to form a generally line contact therebetween whereby said valve member may fully engage said valve seat without regard to the relative angulation of said snap blade to a plane lying parallel to said valve seat.

37. A valve assembly as set forth in claim 36 wherein said snap blade is elongated and said raised portion extends generally perpendicular to the longitudinal axis of said snap blade.

* * * * *